(12) United States Patent  
Ferrara et al.

(10) Patent No.: US 12,401,276 B2  
(45) Date of Patent: Aug. 26, 2025

(54) CONTROL CIRCUIT FOR REGULATING OUTPUT VOLTAGE OF A BUCK CONVERTER DURING NEGATIVE LOAD TRANSIENTS

(71) Applicant: STMicroelectronics S.r.l., Agrate Brianza (IT)

(72) Inventors: Enrico Ferrara, Milan (IT); Luca Morinelli, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 206 days.

(21) Appl. No.: 18/154,167

(22) Filed: Jan. 13, 2023

(65) Prior Publication Data

US 2023/0170803 A1 Jun. 1, 2023

Related U.S. Application Data

(63) Continuation of application No. 17/244,406, filed on Apr. 29, 2021, now Pat. No. 11,581,808.

(30) Foreign Application Priority Data

Jun. 4, 2020 (IT) .................. 102020000013231

(51) Int. Cl.  
*H02M 3/158* (2006.01)  
*H02M 1/00* (2007.01)  
*H02M 3/156* (2006.01)

(52) U.S. Cl.  
CPC ......... *H02M 3/158* (2013.01); *H02M 3/1566* (2021.05); *H02M 1/0009* (2021.05); *H02M 1/0019* (2021.05)

(58) Field of Classification Search  
CPC .... H02M 3/158; H02M 1/009; H02M 1/0019; H02M 3/1566  
See application file for complete search history.

(56) References Cited

U.S. PATENT DOCUMENTS 5,670,865 A 9/1997 Farwell  
7,251,113 B1 7/2007 Batarseh et al.  
(Continued)

FOREIGN PATENT DOCUMENTS

EP 3920399 A1 12/2021

OTHER PUBLICATIONS

Amoroso, Luca, et al., "Single Shot Transient Suppressor (SSTS) for High Current High Slew Rate Microprocessor", 14th Annual Applied Power Electronics Conference and Exposition, Dallas, TX, USA, Mar. 14-18, 1999, pp. 284-288.

(Continued)

*Primary Examiner* — Gustavo A Rosario-Benitez  
(74) *Attorney, Agent, or Firm* — Slater Matsil, LLP

(57) ABSTRACT

An embodiment buck converter control circuit comprises an error amplifier configured to generate an error signal based on a feedback signal and a reference signal, a pulse generator circuit configured to generate a pulsed signal having switching cycles set to high and low as a function of the error signal, a driver circuit configured to generate a drive signal for an electronic switch of the buck converter as a function of the pulsed signal, a variable load, connected between two output terminals of the buck converter, configured to absorb a current based on a control signal, and a detector circuit configured to monitor a first signal indicative of an output current provided by the buck converter and a second signal indicative of a negative transient of the output current, and verify whether the second signal indicates a negative transient of the output current.

20 Claims, 9 Drawing Sheets

(56) References Cited

U.S. PATENT DOCUMENTS

| | | | |
|---|---|---|---|
| 9,178,420 B1 | 11/2015 | Hawley | |
| 9,257,905 B1 | 2/2016 | Kotikalapoodi | |
| 9,602,001 B1 * | 3/2017 | Hung .................... | H02M 3/158 |
| 10,211,735 B1 | 2/2019 | Chen et al. | |
| 10,770,964 B1 * | 9/2020 | Su ........................... | H02M 1/08 |
| 10,797,597 B1 * | 10/2020 | Chang ................... | H02M 3/158 |
| 11,394,301 B1 | 7/2022 | Lisuwandi et al. | |
| 2002/0030473 A1 | 3/2002 | Utsunomiya | |
| 2002/0125871 A1 * | 9/2002 | Groom .................. | H02M 3/156 |
| | | | 323/284 |
| 2010/0201336 A1 * | 8/2010 | Chen .................... | H02M 3/1588 |
| | | | 323/285 |
| 2011/0204859 A1 * | 8/2011 | Prodic ................. | H02M 3/1588 |
| | | | 323/271 |
| 2013/0162235 A1 | 6/2013 | Harada | |
| 2016/0056714 A1 | 2/2016 | Ek | |
| 2016/0365789 A1 * | 12/2016 | Ejury .................... | H02M 3/158 |
| 2017/0179824 A1 * | 6/2017 | Polhemus .......... | G01R 19/0092 |
| 2019/0288603 A1 | 9/2019 | Babazadeh et al. | |

OTHER PUBLICATIONS

Wang, Pai-Yi, et al., "An Undershoot/Overshoot-Suppressed Current-Mode Buck Converter with Voltage-Setting Control for Type-II Compensator", IEEE Asian Solid-State Circuits Conference, Xiamen, Fujian, China, Nov. 9-11, 2015, 4 pages.

* cited by examiner

CONTROL CIRCUIT FOR REGULATING OUTPUT VOLTAGE OF A BUCK CONVERTER DURING NEGATIVE LOAD TRANSIENTS

CROSS-REFERENCE TO RELATED APPLICATIONS

This application is a continuation of U.S. application Ser. No. 17/244,406, filed Apr. 29, 2021, which claims priority to Italian Application No. 102020000013231, filed on Jun. 4, 2020 which applications are hereby incorporated by their reference herein in their entirety.

TECHNICAL FIELD

Embodiments of the present description refer to a control device and method for a buck converter.

BACKGROUND

Power-supply circuits, such as AC/DC or DC/DC switched mode power supplies, are well known in the art. There exist many types of electronic converters, which are mainly divided into isolated and non-isolated converters. For instance, non-isolated electronic converters are the converters of the "buck", "boost", "buck-boost", "Ćuk", "SEPIC", and "ZETA" type. Instead, isolated converters are, for instance, converters of the "flyback", "forward", "half-bridge", and "full-bridge" type. Such types of converters are well known to the person skilled in the art.

FIG. 1 is a schematic illustration of a DC/DC electronic converter 20. In particular, a generic electronic converter 20 comprises two input terminals 200a and 200b for receiving a DC voltage $V_{in}$ and two output terminals 202a and 202b for supplying a DC voltage $V_{out}$. For example, the input voltage Vi, may be supplied by a DC voltage source 10, such as a battery, or may be obtained from an AC voltage by means of a rectifier circuit, such as a bridge rectifier, and possibly a filtering circuit. Instead, the output voltage $V_{out}$ may be used to supply a load 30.

Voltage converters of a non-isolated step-down type are widely used, for example, in order to supply microcontrollers. The ease of use, simplicity, and excellent versatility in the various conditions of input and output voltage render the topology of a buck type one of the most widely used for this type of conversion.

FIG. 2 shows the circuit diagram of a typical buck converter 20. In particular, a buck converter 20 comprises two input terminals 200a and 200b for receiving a DC input voltage $V_{in}$ and two output terminals 202a and 202b for supplying a regulated voltage $V_{out}$, where the output voltage is equal to or lower than the input voltage $V_{in}$.

In particular, typically, a buck converter 20 comprises two electronic switches Q1 and Q2 (with the current path thereof) connected (e.g. directly) in series between the input terminals 200a and 200b, wherein the intermediate node between the electronic switches Q1 and Q2 represents a switching node Lx. Specifically, the electronic switch Q1 is a high-side switch connected (e.g. directly) between the (positive) terminal 200a and the switching node Lx, and the electronic switch Q2 is a low-side switch connected (e.g. directly) between the switching node Lx and the (negative) terminal 200b, which often represents a ground GND. The (high-side) switch Q1 and the (low-side) switch Q2 hence represent a half-bridge configured to connect the switching node Lx to the terminal 200a (voltage $V_{in}$) or the terminal 200b (ground GND).

For example, the switches Q1 and/or Q2 are often transistors, such as Field-Effect Transistors (FETs), such as Metal-Oxide-Semiconductor Field-Effect Transistors (MOSFETs), e.g. n-channel FET, such as NMOS. Frequently, the second electronic switch Q2 is also implemented just with a diode, where the anode is connected to the terminal 200b and the cathode is connected to the switching node Lx.

In the example considered, an inductance L, such as an inductor, is connected (e.g. directly) between the switching node Lx and the (positive) output terminal 202a. Instead, the (negative) output terminal 202b is connected (e.g. directly) to the (negative) input terminal 200b.

In the example considered, to stabilise the output voltage $V_{out}$, the converter 20 typically comprises a capacitor Cout connected (e.g., directly) between the output terminals 202a and 202b.

In this context, FIG. 3 shows some waveforms of the signals of such an electronic converter, where:

FIG. 3a shows the signal $DRV_1$ for switching the electronic switch Q1;

FIG. 3b shows the signal $DRV_2$ for switching the second electronic switch Q2;

FIG. 3c shows the current $I_{Q1}$ that traverses the electronic switch Q1;

FIG. 3d shows the voltage $V_{Lx}$ at the switching node Lx (i.e., the voltage at the second switch Q2); and FIG. 3e shows the current $I_L$ that traverses the inductor L.

In particular, when the electronic switch Q1 is closed at an instant $t_1$ (ON state), the current $I_L$ in the inductor L increase (substantially) linearly. The electronic switch Q2 is at the same time opened. Instead, when the electronic switch Q1 is opened after an interval $T_{ON1}$ at an instant $t_2$ (OFF state), the electronic switch Q2 is closed, and the current $I_L$ decreases (substantially) linearly. Finally, the switch Q1 is closed again after an interval $T_{OFF1}$. In the example considered, the switch Q2 (or a similar diode) is hence closed when the switch Q1 is open, and vice versa.

The current $I_L$ can thus be used to charge the capacitor Cout, which supplies the voltage $V_{out}$ at the terminals 202a and 202b.

In general, the electronic converter 20 hence comprises a control circuit 22 configured to drive the switching of the switch Q1, and possibly of the switch Q2, for repeating the intervals $T_{ON1}$ and $T_{OFF1}$ periodically. For example, typically the buck converter 20 comprises also a feedback circuit 24, such as a voltage divider, configured to generate a feedback signal FB indicative of (and preferably proportional to) the output voltage $V_{out}$, and the control circuit 22 is configured to generate the drive signals $DRV_1$ and $DRV_2$ by comparing the feedback signal FB with a reference signal, such as a reference voltage $V_{ref}$.

A significant number of driving schemes are known for the switch Q1, and possibly for the switch Q2. These solutions have in common the possibility of regulating the output voltage $V_{out}$ by regulating the duration of the interval $T_{ON1}$ and/or the interval $T_{OFF1}$. For instance, in many applications, the control circuit 22 generates a driving signal $DRV_1$ for the switch Q1 (and possibly a driving signal $DRV_2$ for the switch Q2), where the driving signal $DRV_1$ is a Pulse-Width Modulation (PWM) signal, i.e., the duration of the switching interval $T_{SW1}=T_{ON1}+T_{OFF1}$ is constant, but the duty cycle $T_{ON1}/T_{SW1}$ may be variable. In this case, the control circuit 14 typically implements a regulator circuit having a Proportional (P) and/or Integral (I) component, wherein the regulator circuit is configured to vary the duty cycle of the signal $DRV_1$ in order to obtain a required output voltage $V_{out}$. In this case, the various operating modes of the converter (Continuous-Conduction Mode, CCM; Discontinuous-Conduction Mode, DCM; Transition Mode, TM) are well known in the technical field.

One of the most important parameters in a buck converter is the load regulation, which is the capability of the circuit to keep the output voltage $V_{out}$ stable in response to changing load conditions, which also implies a varying output current $i_{out}$. When the output current $i_{out}$, changes in the time, overshoots and undershoots can be observed in the output voltage $V_{out}$ as a function of the ratio $\pm\Delta i_{out}/\Delta T$, wherein $\Delta i_{out}$ represents the variation of the current $i_{out}$ in a given time interval $\Delta T$. In fact, when the output current $i_{out}$ changes, the current $I_L$ supplied by the inductor L may be too high or too low, thereby creating a variation of the voltage $V_{out}$ at the capacitor Cout.

For example, as mentioned before, such a buck converter may be used to supply a microcontroller, which may also be configured to drive other loads. In this case, significant load transitions may occur, such as negative load transient of 1 A/1 us. However, similar load transitions may occur each time the load 30 is a switchable load, which e.g. may comprise one or more loads selectively connected to the output voltage $V_{out}$. For example, assuming a buck converter 20 configured to supply an output voltage $V_{out}$ in a range between 1V and 1.31 V, which e.g. may be settable by adjusting the reference voltage of the control circuit 22, and a maximum overshoot of 6%, the circuit 20 has to be able to maintain the overshoot in the voltage $V_{out}$ below 60 mV for the negative load transient of 1 A/1 us.

SUMMARY

Considering the foregoing, it is therefore an object of various embodiments to provide a control device for a buck converter able to better regulate the output voltage in response to load transients, in particular in response to a negative current transient.

According to one or more embodiments, one or more of the above objects are achieved by a driver circuit for a buck converter having the distinctive elements set forth specifically in the ensuing claims. Embodiments moreover concern a related integrated circuit, electronic buck converter and method.

The claims form an integral part of the technical teaching of the description provided herein.

As mentioned before, various embodiments of the present disclosure relate to a control circuit for a buck converter configured to provide via two output terminals an output voltage and an output current. For example, such a control circuit may be implemented in an integrated circuit.

In various embodiments, the control circuit comprises a first terminal configured to be connected to an electronic switch of the buck converter, a second terminal configured to receive a feedback signal indicative of the output voltage, and two terminals configured to be connected to the two output terminals of the buck converter.

In various embodiments, the control circuit comprises an error amplifier configured to generate an error signal as a function of the feedback signal and a reference signal. For example, in various embodiments, the error amplifier is a regulator having an integral and/or a proportional component.

In various embodiments, the control circuit comprises a pulse generator circuit configured to generate a pulsed signal having switching cycles where the pulsed signal is set to high for a first duration and low for a second duration, wherein the pulse generator circuit is configured to vary the first and/or the second duration as a function of the error signal, and a driver circuit configured to generate a drive signal at the first terminal as a function of the pulsed signal. For example, in various embodiments, the pulse generator circuit is a pulse width modulator, wherein the pulsed signal is a pulse width modulated signal having a constant frequency and a duty cycle determined as a function of the error signal.

In various embodiments, the control circuit comprises also a variable load connected between the two terminals, wherein the variable load is configured to absorb a current determined as a function of a control signal.

In this case, a detector circuit may be configured to generate the control signal by monitoring a first signal indicative of the output current, and a second signal indicative of a negative transient of the output current. For example, the variable load may comprise a current mirror receiving at an input the control signal, and wherein an output of the current mirror is connected between the two terminals. For example, in case the error amplifier is a regulator having an integral component, the first signal may correspond to the error signal. Conversely, the detector circuit may comprise a transient detection circuit configured to determine the second signal by verifying whether the first signal indicates that the output current decreases more than a given amount, and/or verifying whether the feedback signal indicates that the output voltage increases more than a given amount, and/or verifying whether the feedback signal indicates that the output voltage exceeds a given maximum threshold value.

In various embodiments, the detector circuit is thus configured to verify whether the second signal indicates a negative transient of the output current. Specifically, when the second signal does not indicate a negative transient of the output current, the detector circuit stores the monitored first signal. Conversely, when the second signal indicates a negative transient of the output current, the detector circuit generates the control signal as a function of the difference between the stored first signal and the monitored first signal.

In various embodiments, the detector circuit may also verify whether the second signal indicates that the output current is again stable, and when the second signal indicates that the output current is again stable, the detector circuit may gradually reduce the control signal, whereby the variable load absorbs gradually less current.

In various embodiments, the control circuit may also implement an over-current protection. For this purpose, the control circuit may comprise a current ramp generator configured to generate a current ramp signal when the pulsed signal is set to high, a reference electronic switch, wherein the current ramp signal flows through the reference electronic switch when the pulsed signal is set to high, and a comparator circuit configured to compare the voltage at the reference electronic switch with the voltage at the electronic switch of the buck converter, wherein the comparator circuit is configured to set the pulsed signal to low, when the voltage at the electronic switch of the buck converter exceeds the voltage at the reference electronic switch.

BRIEF DESCRIPTION OF THE DRAWINGS

The embodiments of the present disclosure will now be described with reference to the annexed plates of drawings, which are provided purely to way of non-limiting example and in which.

The features and advantages of the present invention will become apparent from the following detailed description of practical embodiments thereof, shown byway of non-limiting example in the accompanying drawings, in which.

DETAILED DESCRIPTION OF ILLUSTRATIVE EMBODIMENTS

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment", "in one embodiment", or the like that may be present in various points of this description do not necessarily refer to one and the same embodiment. Moreover, particular conformations, structures, or characteristics may be combined in any adequate way in one or more embodiments.

The references used herein are only provided for convenience and hence do not define the sphere of protection or the scope of the embodiments.

Figure 1:
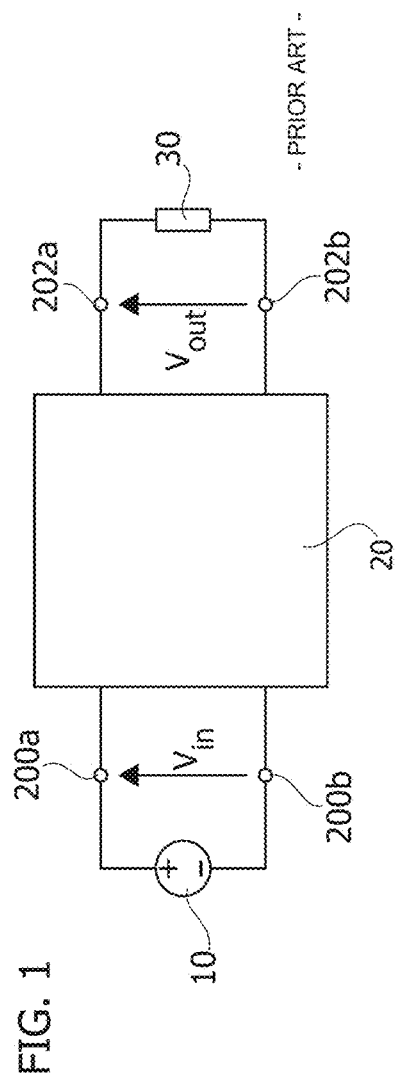
FIG. 1 shows a typical application of an electronic converter.
Figure 2:
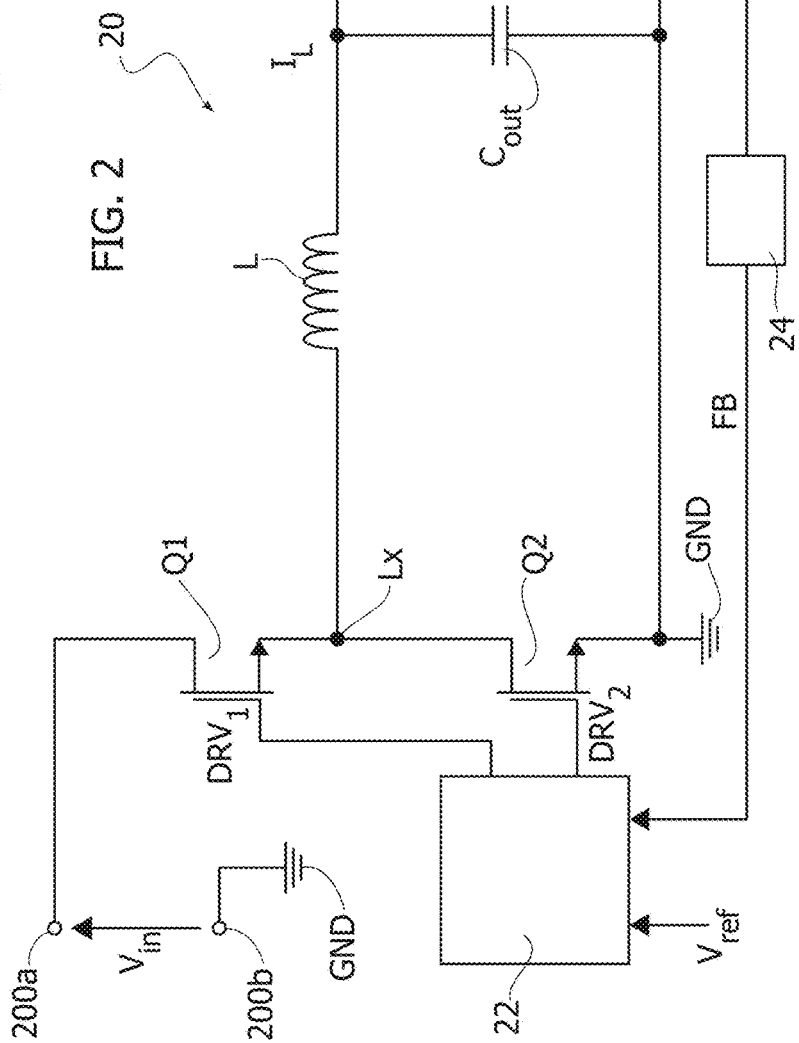
FIG. 2 shows an example of a buck converter.
Figure 3:
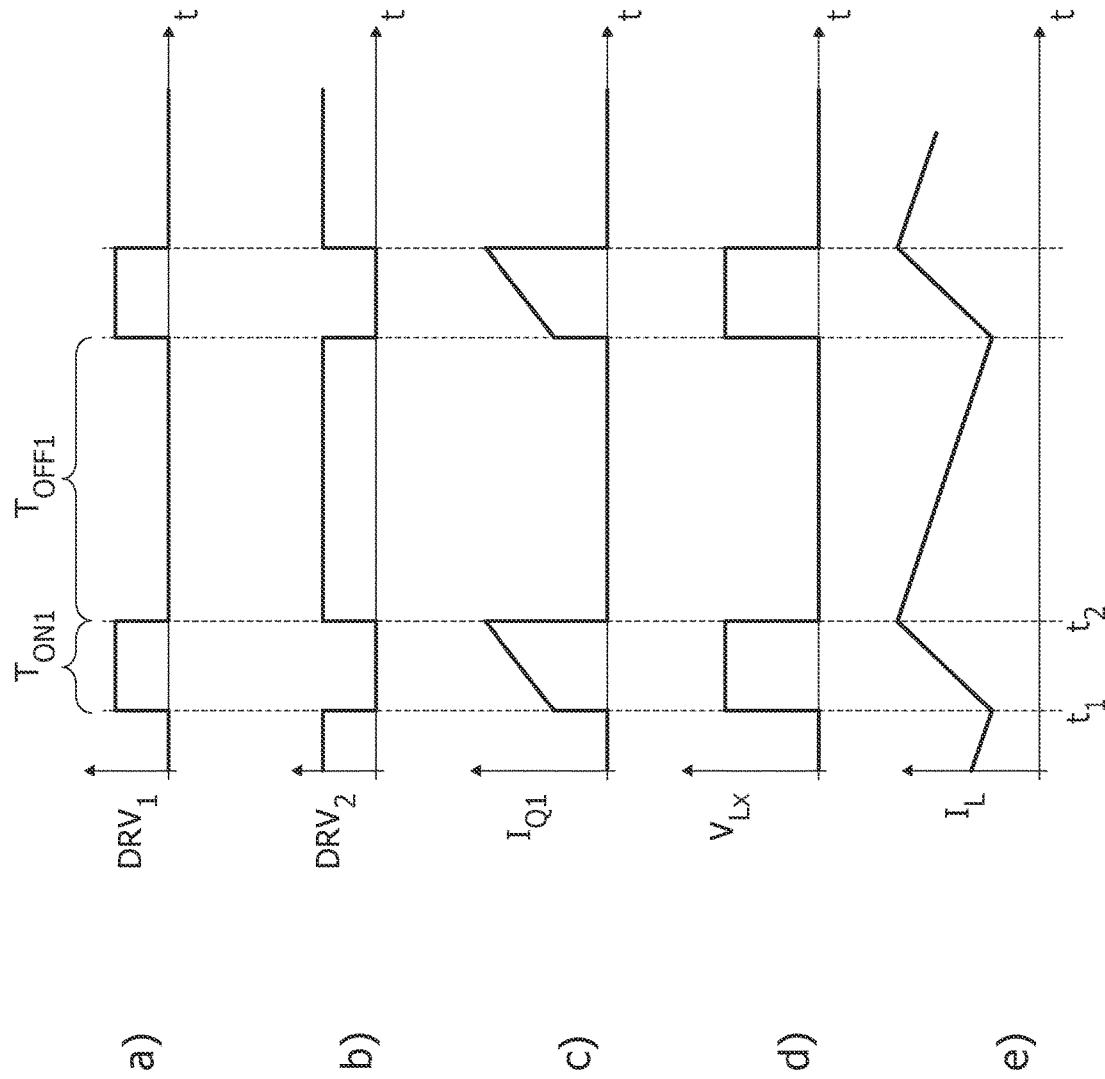
FIG. 3 shows exemplary waveforms of the converter of FIG. 2.

In FIGS. 4 to 11 described below, parts, elements or components that have already been described with reference to FIGS. 1 to 3 are designated by the same references used previously in these figures. The description of these elements has already been made and will not be repeated in what follows in order not to burden the present detailed description.

As explained in the foregoing, various embodiments of the present description relate to a control circuit 22a for a buck converter.

Figure 4:
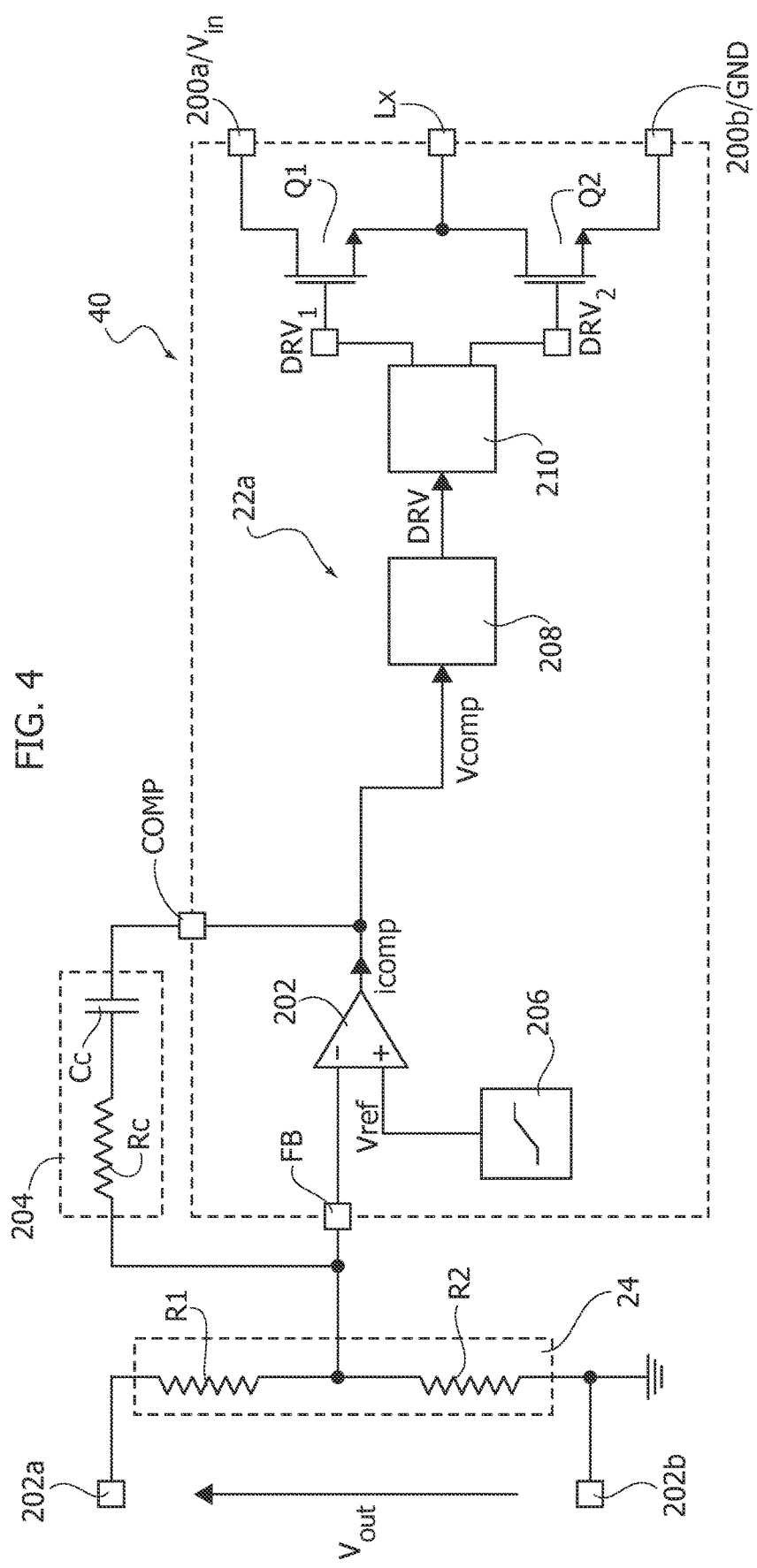
FIG. 4 shows an embodiment of a control circuit for a buck converter.

FIG. 4 shows a first embodiment of a control circuit 22a for a buck converter. For a general description of a buck converter 20, reference may be made to the description of FIGS. 1 to 3. Specifically, as described in the foregoing, a buck converter 20 comprises:

two input terminals 200a and 200b for receiving an input voltage $V_{in}$;

two output terminals 202a and 202b for providing an output voltage $V_{out}$;

two electronic switches Q1 and Q2, such as NMOS (wherein the electronic switch Q2 may also be a diode), connected in series between the terminals 200a and 200b, wherein the intermediate node represents a switching node Lx;

an inductance L, such as an inductor, connected between the switching node Lx and the output terminal 202a;

a capacitor Cout connected between the two output terminals;

a feedback circuit 24, corresponding to a voltage measurement circuit, configured to generate a signal indicative of the output voltage $V_{out}$; and a control circuit 22a configured to generate the drive signals for the electronic switch Q1 and optionally the electronic switch Q2 as a function of the feedback signal FB.

As shown in FIG. 4, in various embodiments, such a control circuit 22a may be implemented in an integrated circuit 40, e.g. the integrated circuit 40 may comprise:

a pad (of a respective die) or pin (of a respective integrated circuit package) configured to be connected to the feedback circuit 24, such as a voltage divider comprising two or more resistors R1 and R2 connected in series between the output terminals 202a and 202b, whereby the feedback signal FB is a voltage proportion to the output voltage $V_{out}$;

a pad/pin for providing the drive signal $DRV_1$ to the electronic switch Q1 and optionally a pad/pin for providing the drive signal $DRV_2$ to the electronic switch Q2, e.g. to the gate terminals of respective FETs; and the control circuit 22a.

As shown in FIG. 3, in various embodiments, the integrated circuit 40 may also comprise the electronic switch Q1 and optionally the electronic switch (or diode) Q2. For example, in this case, the two pads/pins for providing the drive signal $DRV_1$ and $DRV_2$ may be omitted and the integrated circuit may comprise pads/pins for connection to the terminals 200a, 200b and Lx. In various embodiments, the integrated circuit may in any case be connected to the terminals 200a/200b insofar as these terminals may be used to provide the power supply to the control circuit 22a. Alternatively, the power supply for the control circuit 22a may be obtained, e.g., from the input voltage Vi, (terminals 200a/200b) or the output voltage $V_{out}$, (terminals 202a/202b).

In various embodiments, the integrated circuit 40 may also comprises the feedback circuit/voltage measurement circuit 24. In this case, the feedback pad/pin may be omitted and the integrated circuit 40 may comprise two pins/pads for connection to the terminals 202a and 202b. As mentioned before, the integrated circuit 40 may already be connected to the terminal 202b and accordingly the pin/pad for the terminal 202b may be omitted.

Thus, irrespective of the integration of the various blocks in the integrated circuit 40, the control circuit 22a comprises:

a terminal/node for receiving the feedback signal FB indicative of (and preferably proportional to) the output voltage $V_{out}$; and a terminal/node for providing the drive signal $DRV_1$ and optionally a terminal/node for providing the drive signal $DRV_2$.

Specifically, in the embodiment considered, the control circuit 22a comprises an error amplifier configured to generate an error signal $V_{comp}$, by comparing the feedback signal FB with a reference signal, such as a reference voltage $V_{ref}$.

For example, in the embodiment considered, the error amplifier is implemented with an operational amplifier 202 and a compensation/feedback network 204 associated with the operational amplifier 202. For example, in the embodiment considered, the feedback signal FB is connected to the inverting/negative input of the operational amplifier 202 and the reference voltage $V_{ref}$ is connected to the non-inverting/positive input terminal of the operational amplifier 202.

In various embodiments, the compensation network 204 is connected between the output of the operational amplifier 202 and the feedback terminal (e.g. the inverting input of the operational amplifier 202) and/or ground GND, which as mentioned before may correspond to the terminal 200b and/or 202b.

For example, in the embodiment considered, the compensation network 204 comprises at least one capacitor Cc (integral component) and/or at least one resistor Rc (proportional component). For example, in the embodiment considered, a resistor Rc and a capacitor Cc are connected in series between the feedback terminal and the output of the operational amplifier 202. Specifically, in the embodiment considered, the operational amplifier 202 provides a current $i_{comp}$ as a function of the difference between the reference voltage $V_{ref}$ and the feedback signal FB, and the compensation network 204, e.g. via the resistor Rc and/or the capacitor Cc, is configured to convert the current $i_{comp}$ into the error signal/voltage $V_{comp}$.

In general, the compensation network 204 may be integrated in or may be external to the integrated circuit 40. For example, in the embodiment considered, the integrated circuit 40 comprises a pin/pad COMP connected to the output of the operational amplifier 202, and the compensation network 204 may be connected (e.g. externally) between the pin/pad COMP and ground GND.

Accordingly, in various embodiments, the error amplifier 202/204 may be configured as regulator comprising an I (Integral) and/or a P (Proportional) component.

In the embodiment considered, the error signal $V_{comp}$ is provided to a pulse generator circuit 208, such as a PWM generator circuit, configured to generate a binary/pulsed signal DRV which is alternatively set to a first logic level (e.g. high) and a second logic level (e.g. low) for respective durations $T_1$ and $T_2$. Specifically, the pulse generator circuit 208 is configured to vary at least one of the durations $T_1$ and $T_2$ as a function of the error signal $V_{comp}$.

In the embodiment considered, the binary/pulsed signal DRV is provided to a driver circuit 210 configured to generate the drive signal $DRV_1$ and $DRV_2$ as a function of the drive signal DRV. For example, in various embodiments, the driver circuit 210 may be configured to:
  set the signal $DRV_1$ to high when the signal DRV has the first logic level and to low when the signal DRV has the second logic level; and
  optionally set the signal $DRV_2$ to high when the signal DRV has the second logic level and to low when the signal DRV has the first logic level.

Accordingly, in various embodiments the switch-on and switch-off durations $T_{ON1}$ and $T_{OFF1}$ correspond to the durations $T_1$ and $T_2$, respectively. For example, the logic levels of the signal $DRV_1$ may correspond to the logic levels of the signal DRV, and optionally the logic levels of the signal $DRV_2$ may correspond to the inverted version of the logic levels of the signal DRV.

Accordingly, essentially, the feedback loop via the feedback circuit 24 and the error amplifier 202/204 varies the error signal $V_{comp}$, which in turn is used by the pulse generator circuit 208 to drive via the driver circuit 210 the electronic switches Q1 and Q2, thereby regulating the output voltage $V_{out}$ to a requested value, which may be determined, e.g., as a function of the scaling factor of the feedback circuit 24 and the reference voltage $V_{ref}$.

In various embodiments, the reference voltage $V_{ref}$ may also be provided by a soft-start circuit 206 configured to increase, in response to a power-on of the control circuit 22a, the reference voltage $V_{ref}$ from a minimum value (e.g. 0 V) to a maximum value (corresponding to the nominal value of the reference voltage $V_{ref}$).

Figure 5:
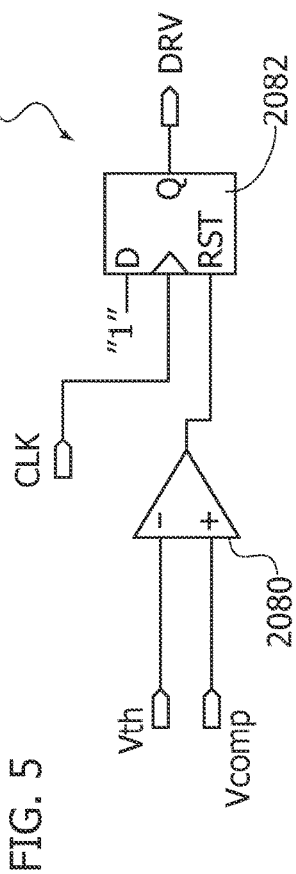
FIG. 5 shows an embodiment of a pulse generator circuit for the control circuit of FIG. 4.

FIG. 5 shows a possible embodiment of the pulse generator circuit 208. For example, in the embodiment considered, the pulse generator circuit 208 is a fixed frequency PWM generator circuit, i.e. the signal DRV has a constant switching frequency ($T_{SW}=T_1+T_2$) and a variable duty cycle ($D=T_1/T_{SW}$).

For example, in the embodiment considered, the error signal $V_{comp}$ is provided to an input (e.g. the positive input terminal) of a comparator 2080 configured to determine whether the error signal $V_{comp}$ is smaller or greater than a threshold value $V_{th}$.

Specifically, in the embodiment considered, the signal at the output of the comparator 2080 is fed to a flip-flop 2082 configured to set the signal DRV to:
  high with the rising edge (or alternatively the falling edge) of a clock signal CLK; and
  low when the error signal $V_{comp}$ reaches or exceeds the threshold value $V_{th}$.

For example, in the embodiment considered, the flip-flop 2082 is a D type flip-flop receiving:
  at a clock input the clock signal CLK;
  at a data input the logic value high ("1"); and
  at a reset input the signal provided by the comparator 2080.

Thus, in the embodiment considered, the signal DRV is set to high with a fixed frequency (determined by the clock signal CLK) and then set to low when the signal $V_{comp}$ reaches or exceeds the threshold value $V_{th}$.

Generally, the embodiment shown in FIG. 5 may also be adapted to support an over-voltage protection and/or burst mode. Specifically, by using an additional comparator configured to determine whether the feedback signal FB exceeds a given maximum threshold value, the flip-flop 2082 may receive a masked version of the clock signal CLK, whereby:
  when the feedback signal FB is smaller than the maximum threshold, the flip-flop 2082 is periodically set via the clock signal CLK; and
  when the feedback signal FB is greater than the maximum threshold, the clock signal CLK is masked and the flip-flop 2082 remains reset.

As mentioned before, various embodiments of the present disclosure relate to solutions, which permit to limit the overshoot of the output voltage $V_{out}$, when the output current $i_{out}$ varies rapidly.

For example, in the control circuit 22a shown in FIG. 4 there will be intrinsic delays (e.g. due to the operational amplifier 202, the compensation network and the pulse generator circuit 208, e.g. the comparator 2080) in the regulation loop, which usually cannot ensure that the output voltage $V_{out}$ does not increase significantly, e.g. because there may still be stored energy in the inductance L or the error signal $V_{comp}$ will not follow immediately the load variation.

Figure 6:
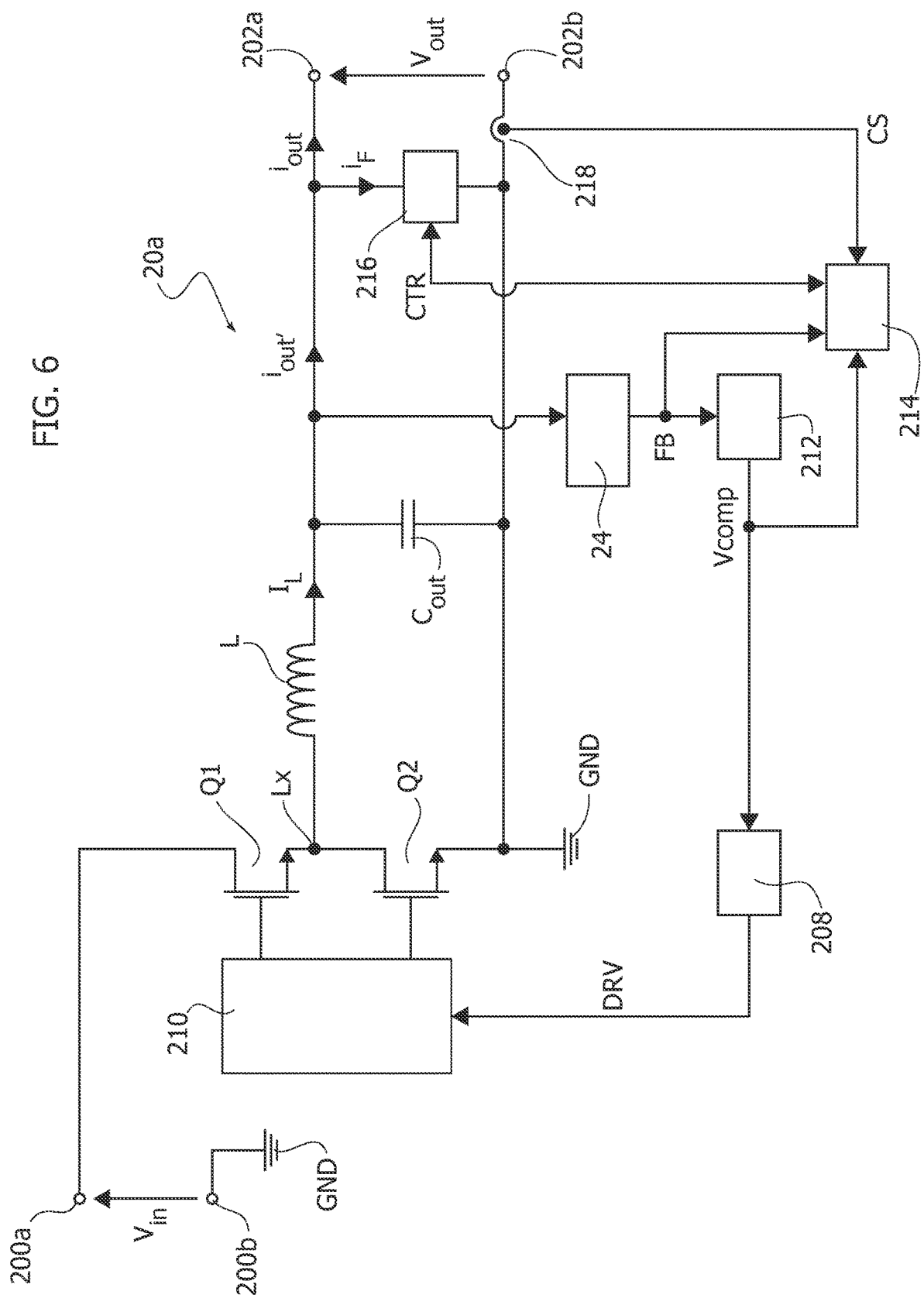
FIG. 6 shows an embodiment of a buck converter comprising a detector circuit and a variable load.

FIG. 6 shows an embodiment of a modified buck converter 20a, and in particular a modified control circuit 22a. Specifically, also in this case, the control circuit 22a comprises:

- a terminal configured to be connected to a feedback circuit 24 configured to generate a feedback FB as a function of the output voltage $V_{out}$;
- an error amplifier 212 configured to generate an error signal $V_{comp}$ as a function of the feedback FB, wherein the error amplifier 212 may comprise the operational amplifier 202, the compensation network 204 and optionally the soft-start circuit 206 of FIG. 4;
- a pulse generator circuit 208 configured to generate a pulsed signal DRV; and
- a driver circuit 210 configured to generate the drive signal $DRV_1$ and optionally the drive signal $DRV_2$ as a function of the signal DRV.

Accordingly, these blocks are configured to regulate during normal operation the output voltage $V_{out}$ to a given requested value.

In the embodiment considered, the control circuit 22a comprises a variable load 216 configured to absorb a current $i_F$ as a function of the control signal CTR and a detector circuit 214 configured to generate the control signal CTR (at least) as a function of a signal being indicative of the output current $i_{out}$.

Figure 7:
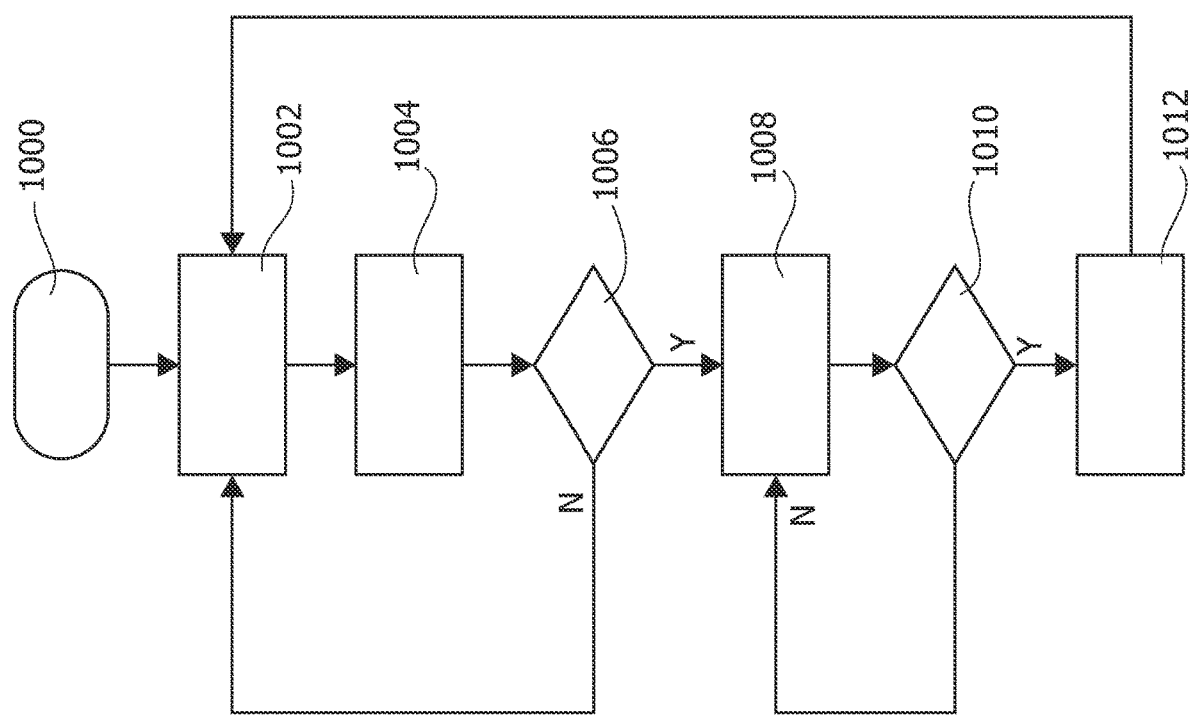
FIG. 7 shows an embodiment of the operation of the buck converter of FIG. 6.

FIG. 7 shows an embodiment of the operation of the detector circuit 214. In the embodiment considered, after a start step 1000, the detector circuit 214 monitors at a step 1002 the signal being indicative of the output current $i_{out}$ provided via the output terminals 202a and 202b. For example, the signal being indicative of the output current $i_{out}$ may be a current sense signal CS provided by a current sensor 218, such as a shunt resistor, connected in series with the output terminals 202a and 202b. Alternatively, in case the compensation network 204 comprises a capacitor Cc, whereby the error signal $V_{comp}$ is proportional to (or at least indicative of) the output current $i_{out}$, the signal being indicative of the output current $i_{out}$ may correspond to the error signal $V_{comp}$.

At a following step 1004, the detector circuit 214 stores the signal being indicative of the output current $i_{out}$. For example, the detector circuit 214 may store the signal being indicative of the output current $i_{out}$ periodically or in response to given events.

At a following step 1006, the detector circuit 214 verifies whether a negative transition of the output current occurs. For example, for this purpose, the detector circuit 214 may verify at least one of the following conditions:

- verify whether the signal being indicative of the output current $i_{out}$ (e.g. the signal $V_{comp}$) indicates that the output current $i_{out}$ decreases more than a given amount (relative variation), e.g. by comparing the current value of the signal being indicative of the output current $i_{out}$ with a respective stored value;
- verify whether the feedback signal FB indicates that the output voltage $V_{out}$ increases more than a given amount (relative variation), e.g. by comparing the current value of the feedback signal FB with a respective stored value; or
- verify whether the feedback signal FB indicates that the output voltage $V_{out}$ exceeds a given maximum threshold value (absolute value).

In case no negative transient of the output current is detected (output "N" of the verification step 1006), the detector circuit 214 may return to the step 1002 for performing a new monitoring operation.

Conversely, in case a negative transition of the output current is detected (output "Y" of the verification step 1006), the detector circuit 214 proceeds to a step 1008, where the detector circuit 214 generates the control signal CTR. Specifically, in various embodiments, the control signal CTR is indicative of the difference between the stored signal and the current value of the signal being indicative of the output current $i_{out}$. Accordingly, when the converter 20a provides a given output current $i_{out,1}$ and the output current is reduce to a value $i_{out,2}$, the detector circuit 214 drives the variable load 216 via the signal CTR in order to absorb a current $i_F = i_{out,1} - i_{out,2}$, whereby the total current $i_{out}' = i_F + i_{out,1}$ provided by the capacitor Cout remains constant.

The step 1006 is thus purely optional, because when the monitored signal corresponds to the stored signal (static condition), also the signal CTR would indicate that the difference is zero and the variable load 216 would absorb a current $i_F = 0$.

In various embodiments, the detector circuit 214 proceeds then to a verification step 1010, where the detector circuit 214 verifies whether the output current $i_{out}$ remains stable. For example, for this purpose, the detector circuit 214 may verify at least one of the following conditions:

- verify whether the signal being indicative of the output current $i_{out}$ (e.g. the signal $V_{comp}$) indicates that the output current $i_{out}$ varies less than a given amount (relative variation), e.g. by comparing the current value of the signal being indicative of the output current $i_{out}$ with a respective stored value;
- verify whether the feedback signal FB indicates that the output voltage $V_{out}$ varies less than a given amount (relative variation), e.g. by comparing the current value of the feedback signal FB with a respective stored value; or
- verify whether the feedback signal FB indicates that the output voltage $V_{out}$ is below a given maximum threshold value (absolute value).

In case the output current $i_{out}$ is not stable (output "N" of the verification step 1010), the detector circuit returns to the step 1008.

Conversely, in case the output current $i_{out}$ is stable (output "Y" of the verification step 1010), the detector circuit 214 may reduce (preferably gradually and slowly) the control signal CTR, e.g. by reducing the stored value, whereby the variable load 216 absorbs less current $i_F$ and the feedback loop regulated the output voltage $V_{out}$ as a function of the new load condition. However, insofar as the detector circuit 214 is configured to vary the control signal CTR with a time constant being greater than the time constant of the feedback loop, the feedback loop is able to follow the load variation without overshoots in the output voltage $V_{out}$.

Accordingly, once the detector circuit 214 has reduced the current $i_F$ to zero via the control signal CTR, the detector circuit 214 may return to the step 1002 for detecting a following load transition.

Accordingly, in various embodiments, the detector circuit 214 is configured to track the output current load and sample its value. This sampled value is used to apply an internal current load $i_F$ to the output terminals 202a and 202b in order to replace the reduction of the external load current. Next, the detector circuit 214 may decrease the internal current load $i_F$ with a controlled slope minimizing overshoot.

Figure 8:
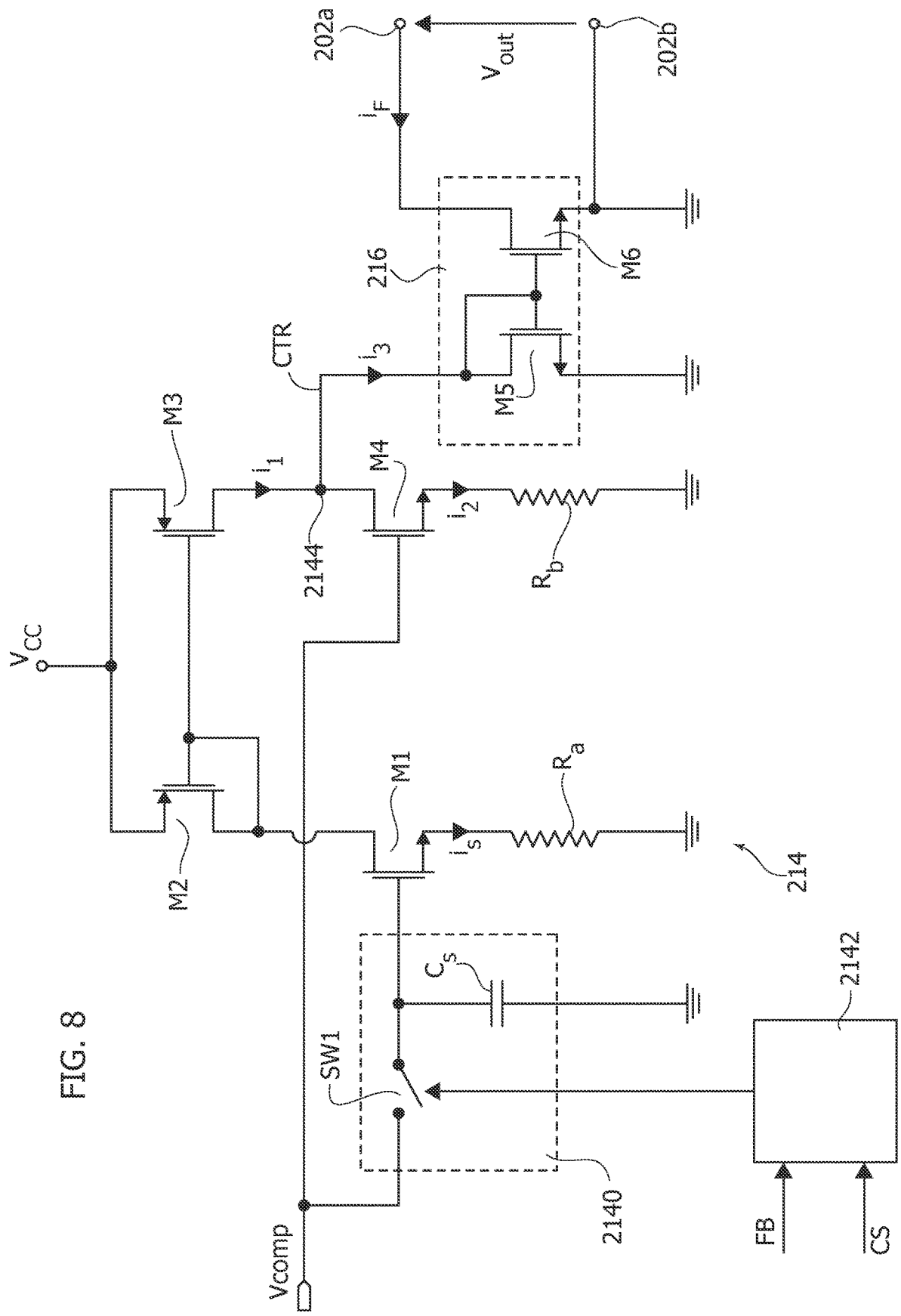
FIG. 8 shows a first embodiment the detector circuit and the variable load of FIG. 6.

FIG. 8 shows a possible embodiment of the detector circuit 214 and the variable load 216. Specifically, in the embodiment considered, the signal being indicative of the output current $i_{out}$ corresponds to the error signal $V_{comp}$. However also the current sense signal CS may be used.

In the embodiment considered, the error signal $V_{comp}$ is provided to an analog sample-and-hold circuit 2140. For example, such a sample-and-hold circuit 2140 may be implemented with a storage capacitor $C_S$ and an electronic switch SW1 configured to connect the storage capacitor $C_S$ to the error signal $V_{comp}$.

In the embodiment considered, the sample-and-hold circuit 2140, e.g. the electronic switch SW1, is controlled by a negative transient detection circuit 2142. For example, this circuit may be configured to:
- enable storage of the error signal $V_{comp}$ (e.g. close the electronic switch SW1) when no negative load transient is detected; and
- disable storage of the error signal $V_{comp}$ (e.g. open the electronic switch SW1) when a negative load transient is detected.

For example, as described in the foregoing, the negative transient detection circuit 2142 may monitor for this purpose the variation or absolute value of the feedback signal FB, or the variation of the current sense signal CS. For example, such transients may be detected by determining the variation of a respective signal by comparing the signal with a previous value of the signal (e.g. stored via a sample-and-hold circuit, e.g. 2140) or via a derivative network.

In the embodiment considered, the detector circuit 214 comprises a first current generator M1/M2/M3 configured to generate a current $i_t$ proportional to the stored error signal $V_{comp}$. Specifically, in the embodiments, the stored error signal $V_{comp}$ is provided to a variable current generator M1, e.g. implemented with a FET, e.g. an n-channel FET, and a resistor Ra, configured to provide a current is proportional to the stored error signal $V_{comp}$. In various embodiments, the current is is provided also at input to a current mirror M2/M3, e.g. implemented with two FETs, such as p-channel FET, thereby providing at an output of the current mirror M2/M3 the current $i_1$, which is applied to a node 2144.

Similarly, in the embodiment considered, the detector circuit 214 comprises a second variable current generator M4, e.g. implemented with a FET, e.g. an n-channel FET, and a resistor Rb, configured to generate a current $i_2$ proportional to the current error signal $V_{comp}$.

Specifically, also the current generator M4 is connected to the node 2144, whereby the node 2144 provides a current $i_3$ corresponding to the difference between the current $i_1$ and the current $i_2$, i.e. $i_3=i_1-i_2$.

Accordingly, in the embodiment considered, the current $i_3$ corresponds to the control signal CTR being indicative of the difference between the stored and current value of the signal being indicative of the output current $i_{out}$.

For example, in the embodiment considered, the variable load 216 is implemented with a current mirror M5/M6, e.g. implemented with two FETs, such as n-channel FET, wherein the input (M5) of the current mirror receives the current $i_3$ and the output (M6) of the current mirror, which thus provides a current $i_F$ proportional to the current $i_3$, is connected between the terminals 202a and 202b.

Accordingly, by adjusting the gain of the various current generators and current mirrors, the proportionally between the current $i_F$ and the variation of the output current $i_{out}$ may be set, e.g. in order to reproduce (approximately) the same proportionally between the error signal $V_{comp}$ and the average current $I_L$ provided by the inductance L in response to the respective switching of the switches Q1 and Q2 generated via the blocks 208 and 210.

Figure 9:
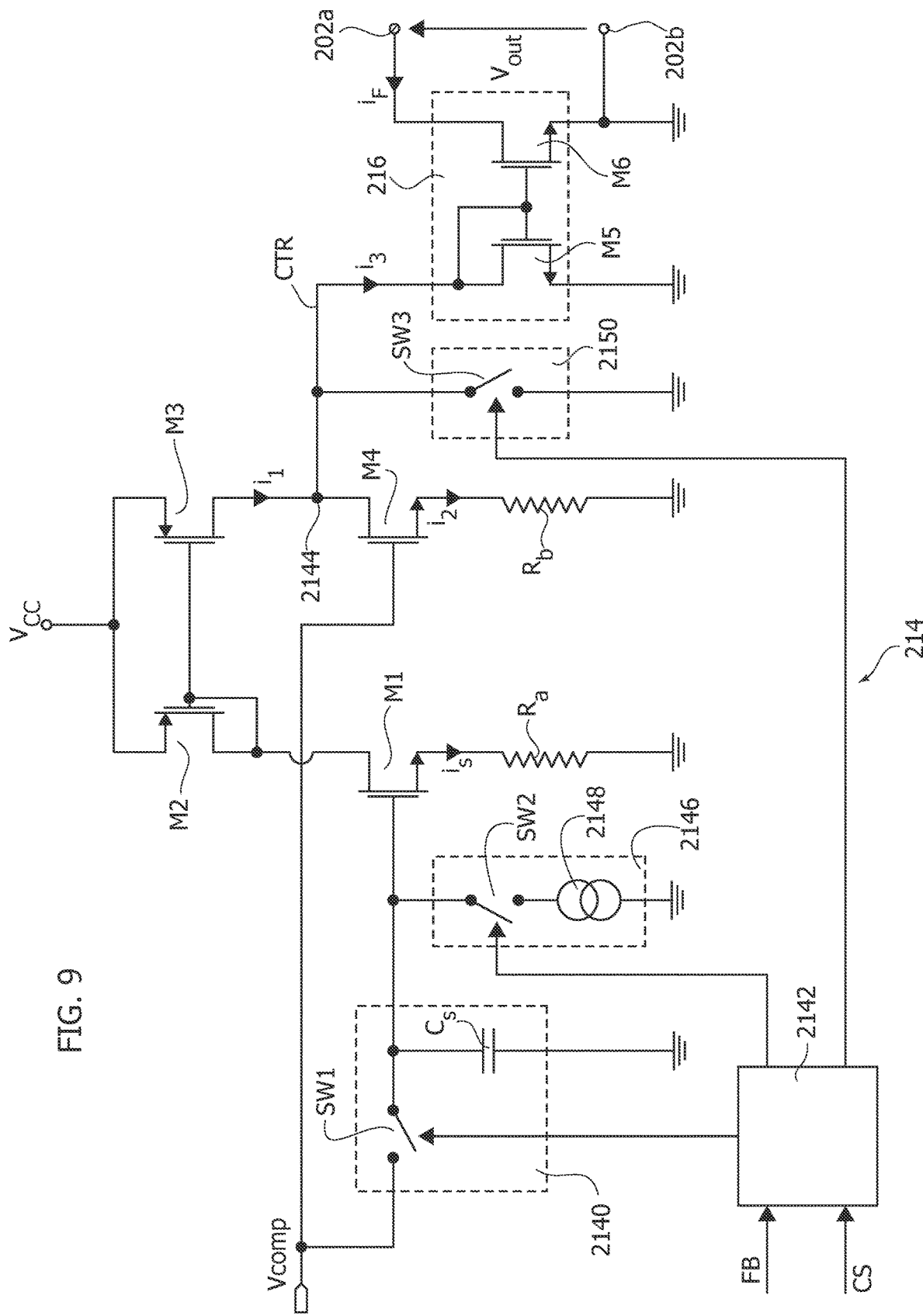
FIG. 9 shows a second embodiment the detector circuit and the variable load of FIG. 6.

FIG. 9 shows a second embodiment of the detector circuit 214 and the variable load 216. Specifically, as mentioned before, the detector circuit 214 may be configured to reduce the signal CTR when the output load is static (step 1012).

For example, in the embodiment considered, the detector circuit 214 comprises for this purpose a discharge circuit 2146 configured to selectively discharge the capacitor $C_S$. For example, in FIG. 9, the discharge circuit 2146 comprises an electronic switch SW2 and a current source 2148 connected in series between the output of the sample-and-hold circuit 2140/input of the variable current generator M1/Ra and ground GND. For example, also the electronic switch SW2 may be driven via the control circuit 2142.

In various embodiments, the detector circuit and/or the variable load 216 may be configured to be selectively enabled via an enable circuit 2150. For example, in the embodiment considered, the enable circuit 2150 is implemented with an electronic switch S3 connected between the node 2144, i.e. the output of the detector circuit 214/the input of the variable load 216, and ground GND. For example, also the electronic switch SW3 may be driven via the control circuit 2142.

Accordingly, in various embodiments the control circuit 2142 may be configured to monitor whether a negative transient of the output current $i_{out}$ occurs, and:
- during a normal operation (in the absence of a negative transient, e.g. the negative variations is below a given threshold), close the electronic switch SW1 (i.e. enable storage of the sample-and-hold circuit 2140) and the electronic switch SW3 (i.e. disable the variable load 216), and open the electronic switch SW2 (i.e. progressive reduction of the control signal CTR is disabled), thereby following the output current and keeping off the variable load 216, which in various embodiments corresponds to an active pull down;
- once a negative transient current load is detected (e.g. a negative variation exceeds a given threshold), open the electronic switch SW1 (i.e. maintain the value stored by the sample-and-hold circuit 2140) and open the electronic switch SW3 (i.e. enable the variable load 216), whereby the current $i_t$ is linked to the stored output current and $i_2$ to the current output current, and the current $i_F$ is proportional to the difference between these currents, i.e. $i_F=K(i_1-i_2)$, where K represents a gain factor; and
- once a new static condition is detected (in the absence of a transients, e.g. the variations are below a given threshold), close the electronic switch SW2, thereby reducing gradually the control signal CTR.

Figure 10:
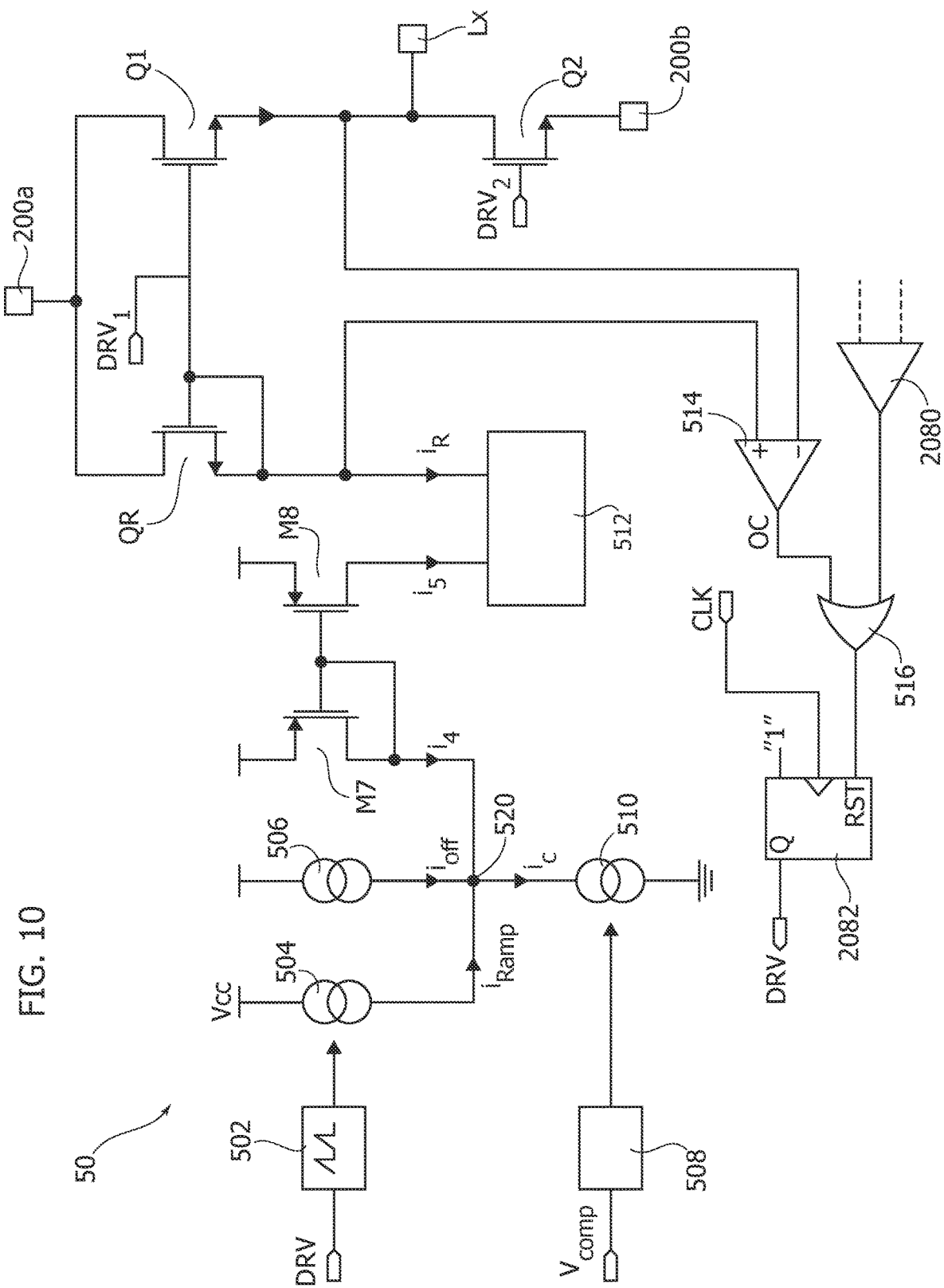
FIGS. 10 and 11 show embodiments of a current limiter for the high side switch of the buck converter of FIG. 6.

FIG. 10 shows an embodiment of an over-current protection circuit for the (high-side) electronic switch Q1. Specifically, as shown in FIG. 3, the current IQ, flowing through the electronic switch Q1 has a substantially linear behavior during the switch-on duration $T_{ON1}$, wherein the current increases from a minimum value at the instant $t_1$ to a maximum value at the instant $t_2$. In the embodiment shown in FIG. 10, the circuit 50 is thus configured to generate a reference current $i_R$ having a similar behavior, i.e. the circuit 50 is configured to generate a reference current $i_R$ which increases linearly during the switch-on duration $T_{ON1}$ from a minimum value at the instant $t_1$ to a maximum value at the instant $t_2$, i.e. during the period when the signal DRV is set to high.

For example, in the embodiment considered, the circuit 50 comprises a ramp current generator 502, 504 configured to generate a current ramp signal $i_{Ramp}$ as a function of the pulsed signal DRV. For example, in the embodiment considered, the ramp current generator 502, 504 comprises:

- a voltage ramp generator 502 configured to generate a ramp signal which is set to zero when the signal DRV is low, and then increased linearly when the signal DRV is high; and
- a variable current generator 504 configured to generate the current $i_{Ramp}$ as a function of the voltage ramp signal provided by the voltage ramp generator 502.

In various embodiments, the ramp current $i_{Ramp}$ is provided to a node 520.

Specifically, in various embodiments, the node 520 is also connected to a current generator 506 providing a constant offset current $i_{Offset}$.

In various embodiments, the node 520 is also connected to a further current generator 508 configured to determine a current $i_c$ as a function of the signal $V_{comp}$, wherein the current $i_c$ is preferably proportional to the signal $V_{comp}$. Specifically, in various embodiments, the current generator 508 uses a low-pass filtered version of the voltage $V_{comp}$ as determined e.g. via a low-pass filter 508.

Accordingly, in various embodiments, the current $i_4$ corresponds to:

$$i_4 = i_c - i_{Off} - i_{Ramp}$$

Accordingly, in various embodiments, the current $i_4$ corresponds to a decreasing ramp signal.

In the embodiment considered, the current $i_4$ is then provided to a current limiter circuit 512 configured to generate the current $i_R$ by limiting the current $i_4$ to a given maximum value $i_{max}$.

As shown in FIG. 10, in various embodiments, the current $i_4$ may be provided to the current limiter circuit 512 indirectly by generating a current $i_5$ via a current mirror M7, M8, e.g. implemented with PMOS transistors.

Figure 11:
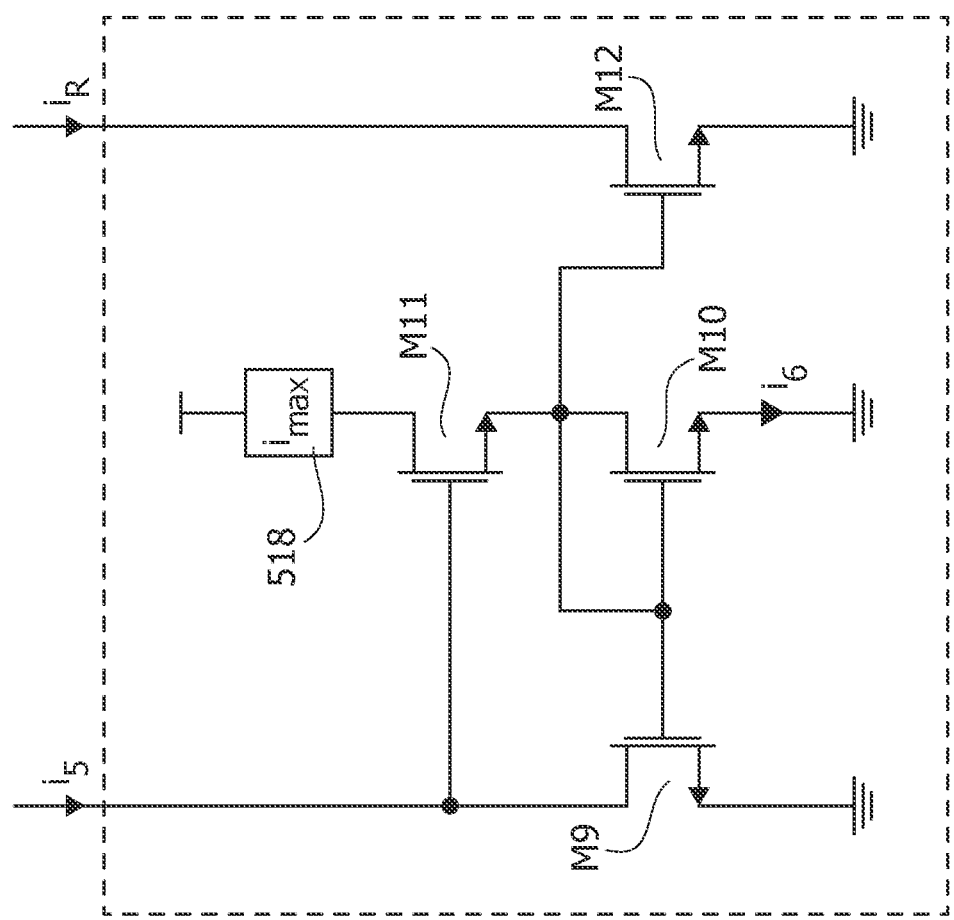

For example, FIG. 11 shows an embodiment of the current limiter circuit 512. Specifically, in the embodiment considered, the current limiter 512 is implemented with a Wilson current mirror, comprising three transistors, such as NMOS.

Specifically, in the embodiment considered, the Wilson current mirror comprises:

- a first branch comprising a transistor M9 receiving the current $i_4$ or $i_5$;
- a second branch comprising two transistors M11 and M10 connected in series, wherein the gate terminal of the transistor M11 is connected to the drain terminal of the transistor M9, the drain terminal of the transistor M10 is connected to the source terminal of the transistor M11, and the gate and source terminals of the transistor M10 are connected to the gate and source terminals of the transistor M9, respectively.

In various embodiments, a current limiter 518 may thus be connected in series with the second branch, thereby limiting the current flowing through the second branch to a maximum value $i_{max}$.

In the embodiment considered, a current mirror M10, M12 may then be used to generate the current $i_R$ by mirroring the current flowing through the second branch. Accordingly, in various embodiments, the current $i_R$ corresponds to the current $i_4$ when $i_4 < i_{max}$ and $i_{max}$ when $i_4 > i_{max}$.

In the embodiment considered, the reference current $i_R$ is provided to a reference transistor QR, preferably corresponding to a scaled version of the transistor Q1. For example, in the embodiment considered, the reference transistor QR is an n-channel FET, e.g. a NMOS, wherein the drain terminal is connected to the terminal 200*a*, the source terminal is connected to the reference current $i_R$, and the gate terminal is connected to the drive signal $DRV_1$. Specifically, by using a scaled version of the transistor Q1, also the reference current $i_R$ may be a scaled version of the expected current profile of the current $I_{Q1}$.

Thus, by comparing the currents flowing through the transistors Q1 and QR or the voltage at the transistors Q1 and QR, the circuit 50 may detect whether the current $I_{Q1}$ remains below the limit indicated by the reference current $i_R$. For example, in various embodiments, the voltage at the source terminals of the transistors Q1 and QR are fed to a comparator 514 configured to generate a signal OC indicating that the current flowing through the transistor Q1 exceeds the limit indicated by the current $i_R$. For example, in this case, the transistor Q1 may be opened. For example, in the embodiment considered, the signal OC is fed via an OR gate (also receiving the signal provided by the comparator 2080) to the reset input of the flip-flop 2082.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A method, comprising:
   storing a first signal indicative of an output current of a buck converter based on determining that a second signal indicative of a negative transient of the output current does not indicate the negative transient;
   generating a control signal as a function of a difference between the stored first signal and a third signal indicative of the output current, the generating the control signal being based on determining that a fourth signal indicative of the negative transient indicates the negative transient, the third signal and the fourth signal being subsequent signals in time to the first signal and the second signal; and
   driving, by the buck converter, a variable load coupled between two output terminals of the buck converter as a function of the control signal.

2. The method of claim 1, wherein the determining that the second signal does not indicate the negative transient comprises one or more of:
   determining that the first signal indicates a decrease in the output current greater than a first value;
   determining that a feedback signal indicates an increase in an output voltage of the buck converter greater than a second value; and
   determining that the feedback signal indicates an increase in the output voltage greater than a threshold, or a combination thereof.

3. The method of claim 1, wherein the determining that the fourth signal indicates the negative transient comprises one or more of:
   determining that the third signal indicates a decrease in the output current greater than a first value;
   determining that a feedback signal indicates an increase in an output voltage of the buck converter greater than a second value; and
   determining that the feedback signal indicates an increase in the output voltage greater than a threshold, or a combination thereof.

4. The method of claim 1, further comprising reducing the control signal based on determining that the second signal or the fourth signal indicates a stable output current.

5. The method of claim 4, wherein the reducing the control signal causes the variable load to draw less current.

6. The method of claim 1, further comprising:
generating an error signal as a function of a feedback signal indicative of an output voltage of the buck converter; and
generating a pulsed signal set to high for a first duration and set to low for a second duration, wherein the first duration and the second duration are varied as a function of the error signal.

7. The method of claim 6, further comprising generating a drive signal at a first terminal as a function of the pulsed signal, the first terminal being a terminal couplable to an electronic switch of the buck converter.

8. A circuit for a buck converter, the circuit configured to:
store a first signal indicative of an output current of the buck converter based on determining that a second signal indicative of a negative transient of the output current does not indicate the negative transient; and
generate a control signal as a function of a difference between the stored first signal and a third signal indicative of the output current, the generating the control signal being based on determining that a fourth signal indicative of the negative transient indicates the negative transient, the third signal and the fourth signal being subsequent signals in time to the first signal and the second signal, wherein the buck converter is configured to drive a variable load coupled between two output terminals of the buck converter as a function of the control signal.

9. The circuit of claim 8, further comprising a feedback terminal configured to receive a feedback signal indicative of an output voltage of the buck converter.

10. The circuit of claim 9, further comprising:
an error amplifier configured to generate an error signal as a function of the feedback signal;
a pulse generator circuit configured to generate a pulsed signal, the pulsed signal set high for a first duration and set low for a second duration, wherein the first duration and the second duration are varied as a function of the error signal; and
a drive circuit configured to generate a drive signal at a second terminal as a function of the pulsed signal, the second terminal configured to be coupled to an electronic switch of the buck converter.

11. The circuit of claim 9, further comprising an error amplifier configured to generate an error signal as a function of the feedback signal, the error amplifier being a regulator having an integral component, a proportional component, or an integral and a proportional component.

12. The circuit of claim 8, wherein the determining that the second signal does not indicate the negative transient comprises one or more of:
determining that the first signal indicates a decrease in the output current greater than a first value;
determining that a feedback signal indicates an increase in an output voltage of the buck converter greater than a second value; and
determining that the feedback signal indicates an increase in the output voltage greater than a threshold.

13. The circuit of claim 8, wherein the determining that the fourth signal indicates the negative transient comprises one or more of:
determining that the third signal indicates a decrease in the output current greater than a first value;
determining that a feedback signal indicates an increase in an output voltage of the buck converter greater than a second value; and
determining that the feedback signal indicates an increase in the output voltage greater than a threshold, or a combination thereof.

14. A circuit of a buck converter, the circuit comprising:
a sample and hold circuit configured to store, at a first time, a first signal indicative of an output current of the buck converter based on determining that a second signal indicative of a negative transient of the output current does not indicate the negative transient;
a first current generator configured to generate a first current proportional to the stored first signal at the first time; and
a second current generator configured to generate, at a second time, a second current proportional to a third signal indicative of the output current, wherein the circuit is configured to generate, at the second time, a control signal as a function of a difference between the first current and the second current, the generating the control signal being based on determining that a fourth signal indicative of the negative transient indicates the negative transient.

15. The circuit of claim 14, wherein the first current generator comprises a current mirror having a first field effect transistor (FET) and a second FET.

16. The circuit of claim 14, wherein the sample and hold circuit comprises a switch coupled to a capacitor.

17. The circuit of claim 14, wherein the second current generator comprises a field effect transistor (FET) coupled to a resistor.

18. The circuit of claim 14, further comprising a third current generator coupled to the first current generator, the third current generator configured to generate a third current proportional to the stored first signal at the first time, wherein the first current is a function of the third current.

19. The circuit of claim 14, wherein the first current generator is coupled to a voltage source.

20. The circuit of claim 14, wherein the buck converter is configured to drive a variable load coupled between two output terminals of the buck converter as a function of the control signal.

* * * * *